United States Patent [19]
Davis

[11] Patent Number: 5,176,868
[45] Date of Patent: Jan. 5, 1993

[54] LONG FIBER REINFORCED THERMOPLASTIC FRAME ESPECIALLY FOR A TENNIS RACQUET

[75] Inventor: Stephen J. Davis, Yardley, Pa.

[73] Assignee: Prince Manufacturing, Inc., Lawrenceville, N.J.

[21] Appl. No.: 645,255

[22] Filed: Jan. 24, 1991

[51] Int. Cl.⁵ .............................................. B29C 33/12
[52] U.S. Cl. .................................. 264/257; 264/258; 264/314
[58] Field of Search ............... 264/257, 258, 313, 314, 264/317

[56] References Cited

U.S. PATENT DOCUMENTS

| | | | |
|---|---|---|---|
| 4,098,505 | 7/1978 | Thompson | 273/73 F |
| 4,123,054 | 10/1978 | Septier | 273/73 F |
| 4,360,202 | 11/1982 | Lo | 273/73 F |
| 4,440,392 | 4/1984 | Popplewell | 273/73 C |
| 4,539,249 | 9/1985 | Curzio | 428/175 |
| 4,579,343 | 4/1986 | Mortvedt | 273/73 D |
| 4,643,857 | 2/1987 | Cousin | 264/46.6 |
| 4,871,491 | 10/1989 | McMahon | 264/29.2 |
| 4,874,570 | 10/1989 | Haines | 264/154 |
| 5,047,263 | 9/1991 | Glemet | 427/203 |

FOREIGN PATENT DOCUMENTS

| | | | |
|---|---|---|---|
| 0040492 | 11/1981 | European Pat. Off. | |
| 0072256 | 8/1982 | European Pat. Off. | 264/258 |
| 0133825 | 3/1985 | European Pat. Off. | |
| 0138294 | 4/1985 | European Pat. Off. | |
| 0272783 | 6/1988 | European Pat. Off. | |
| 0351201 | 1/1990 | European Pat. Off. | |
| 0408161 | 1/1991 | European Pat. Off. | |
| 121074 | 5/1989 | Japan | |
| 121740 | 5/1989 | Japan | |
| 180280 | 7/1990 | Japan | |
| 8503300 | 1/1987 | Netherlands | |

Primary Examiner—Tim Heitbrink
Attorney, Agent, or Firm—White & Case

[57] ABSTRACT

A long fiber, thermoplastic frame for a tennis racquet or other implement is formed of fibers of carbon or other reinforcement material, which are oriented at desired angles, and which are intimately embedded in thermoplastic resin. A frame according to the invention is made by co-winding or commingling tows of carbon or other reinforcing fibers with filaments of thermoplastic material, or by preimpregnating fibers with a thermoplastic powder. The fibers, which are preferable formed into a braided sleeve for ease of handling, are disposed in a heated mold, and internally pressurized to conform to the mold and such that the thermoplastic melts and flows into intimate contact with the fiber material. A frame according to the invention possesses the strength and stiffness of a long fiber, thermoset frame, but unlike a thermoset frame has dynamic stiffness due to the visco-elastic properties of the thermoplastic resin.

11 Claims, 2 Drawing Sheets

LONG FIBER REINFORCED THERMOPLASTIC FRAME ESPECIALLY FOR A TENNIS RACQUET

FIELD OF INVENTION

The present invention relates to the manufacture of fiber reinforced resin frames, especially for tennis racquets.

BACKGROUND OF THE INVENTION

Most high performance tennis racquet frames today are made of resin materials reinforced with fibers, particularly carbon fibers which are used to make the so called graphite frame.

The standard method of producing composite material racquet frames is by using thermoset prepregs. These come in the form of unidirectional sheets, woven fabrics, or braided tubes.

In a conventional method, fiber-impregnated resin tennis racquet frames are made starting with sheets of a prepreg material composed of aligned carbon fibers impregnated with uncured thermoset resin, e.g. a B-stage epoxy resin. An uncured thermoset resin is neither liquid nor solid, and creates a prepreg which is very drapable, soft and formable. It is also very tacky so that plies stick to each other and can be rolled up and packed in the press.

According to this method, the sheets are cut at specific angles and rolled into the shape of a tube. Successive layers are oriented at alternating angles, in order to impart directional rigidity and strength to the finished frame. Usually, the tube is formed on a mandrel over an inflatable bladder or hand rolled. The mandrel is then withdrawn and the tube, still containing the bladder, is packed into a mold in the shape of a frame. In the mold, the bladder is inflated forcing the prepreg tube to conform to the shape of the mold, and the prepreg is heat cured and hardened.

The foregoing method has the advantage of being able to produce high quality racquet frames, but has the disadvantage of requiring a significant amount of labor in forming the prepreg and packing it in the mold. Also, when using this method the prepreg tubes need to be stored in a cool environment. The cured frame also requires significant work in hand finishing when removed from the mold.

According to another method, reinforcing fibers coated with B-stage epoxy are braided into tubes. A bladder is inserted into the tube, and the tubes are internally pressurized and cured in a mold in a manner similar to the process described above for prepreg sheets. The epoxy-coated fibers, however, are tacky, and it thus may be difficult to form and work with the braided tubes. As a result, it may be desirable to limit the choice of materials to an epoxy which is not tacky in the B-stage.

It has also been proposed to make tennis racquets using a thermoplastic, rather than a thermosetting, resin. However, the above-described process cannot, as a practical matter, be used with thermoplastics. In contrast to uncured epoxy prepregs, which at room temperature are drapable, a thermoplastic prepreg would be very hard. In order to use the above process it would thus be necessary to heat the resin to a very high temperature first to form the tube, and again in order to pack the tube in the mold, making it difficult for workers to handle in racquet forming operations. Also, a thermoplastic prepreg would possess no tack, making it difficult to form a tubular layup using multiple layers. Additionally, thermoplastic materials have a relatively small window near the melting point before they start to flow. Even assuming that the prepreg could be heated to the softening point without melting the resin, it would be difficult to maintain constant temperature during processing.

There have been several proposals made, and several tennis racquets introduced to the market, which are made of injection molded, fiber-reinforced thermoplastics. However, these do not employ the same process used to make thermoset racquets, and do not have the same fiber structure. Instead, injection molded thermoplastic racquets are formed using a mixture of resin and short length fibers, which is injected into a racquet mold. The fibers are disbursed through the resin in a random orientation to produce a material with isotropic properties. This has the advantage of simplifying the racquet-forming process, in that the number of manual steps is reduced. However, injection molding processes possess the major limitation that, because the fibers pass through an injection nozzle, they cannot exceed about $\frac{1}{2}$ inch. Inherently then, the reinforcing fibers are much shorter than in a prepreg thermoset resin process, and do not produce the same strength and overall racquet stiffness as in the case of the longer fibers present in a thermoset racquet. Moreover, known thermoplastic processes have the disadvantage that the fiber orientation cannot be controlled.

U.S. Pat. No. 4,643,857 recognizes the fiber length limitation with injection molded thermoplastic racquets, and proposes making a racquet using an extrusion process so that the fiber length can be increased. However, according to the '857 patent, it achieves fiber lengths of only 5 or 6 mm. Such fibers are considerably shorter than the reinforcement fibers used in the thermoset process described above.

It would be desirable to produce a thermoplastic frame which contains reinforcing fibers of much greater length, and preferably of a length comparable to those in known thermoset processes. It would also be desirable to produce a thermoplastic frame in which the orientation of the fibers can be controlled to produce predetermined angular stiffnesses.

SUMMARY OF THE INVENTION

The present invention is a thermoplastic frame, particularly for a tennis racquet, which is reinforced with long fibers, oriented at desired angles, which are intimately embedded in thermoplastic resin. A racquet frame according to the present invention has the property of dynamic stiffness, such that it responds with the stiffness of a thermoset resin racquet for power shots, but has a softer response for touch shots and lobs.

A racquet according to the present invention is made by combining a plurality of reinforcing fibers with a thermoplastic material in a flexible form, such as a filaments of thermoplastic material or a thermoplastic powder. In one preferred embodiment, tows composed of commingled or co-wound thermoplastic filaments and reinforcing fibers are braided to form a flexible sleeve. Several such sleeves can be disposed inside one another, and the multi-layer sleeve is placed in a mold, in the shape of a racquet or other implement, with a bladder disposed inside the sleeve. The mold is then closed and heated, until the thermoplastic melts. At the same time, the bladder is pressurized so that the sleeve conforms to the shape of the mold. After the thermoplastic has melted, the mold is cooled to solidify the thermoplastic material, while maintaining internal pressurization, and the solidified implement is removed.

In another preferred method, reinforcement fiber tows are pre-impregnated with thermoplastic in a powder form. The powder prepreg fiber tows are then braided and molded in the same manner as above.

In the case where the implement is a tennis racquet, it may be desirable to include multiple layers of braided sleeve, in order to form a multiple ply frame, and also to select different angles of fiber orientation in the successive plies. Also, it is possible to deploy reinforcement fibers between the braided sleeves extending in the longitudinal direction for additional strengthening. Preferably, such fibers are combined with thermoplastic filaments or powder which would melt to form the embedding substrate.

Stringing holes ma be formed in the head portion of the frame by hot needle injection, which remelts the thermoplastic Hot needle injection is desirable in that holes can be formed without breaking the reinforcement fibers. Alternatively, however, conventional drilling methods may readily be employed.

A tennis racquet according to the invention has the strength of a long fiber thermoset racquet, and like thermoset processes the ability to control the angle of fiber orientation. But, additionally a racquet according to the present invention, unlike known thermoset racquets, has the property of dynamic stiffness. In a thermoset racquet, cross linking occurs upon curing of the resin. In a thermoplastic resin, cross link chains are not formed, such that the resin possesses visco-elastic properties. A visco-elastic polymer, unlike a thermoset polymer, reacts differently to different rates of loading.

This is significant in the case of a tennis racquet, especially wide body tennis racquets with ultra-stiff frames, since the tradeoff for increased power is often lack of touch. A thermoplastic racquet has the ability to behave like a stiffer, more powerful racquet when hitting a hard shot, yet react like a softer racquet when making a touch shot or lob.

A tennis racquet or other implement frame according to the invention has several other advantages. A thermoplastic, fiber reinforced frame has favorable impact strength Thermoplastic resins have a high strain-to-failure rate and therefore thermoplastic composites can take greater impact load before failure A frame member according to the invention also has desirable vibration dampening properties, due to the fact that thermoplastics are inherently able to absorb vibrations. Thus, a long fiber thermoplastic frame according to the invention has the distinct advantage of having the same stiffness properties as a thermoset frame together with the impact and vibration dampening properties of a short fiber reinforced thermoplastic injection molded frame. Another advantage of the invention is that the frame member may be formed so that, taken from the mold, it has a smoother outer surface than thermosetting resins, and the amount of surface standing and finishing of the frame may be reduced. Also, the weight of the frame can be reduced relative to thermoset frames, due to the fact that thermoplastic resins generally have lower densities.

For a better understanding of the invention, reference is made to the following detailed description of the preferred embodiments, taken in conjunction with the drawings accompanying the application.

DETAILED DESCRIPTION OF THE PREFERRED EMBODIMENTS

Figure 1:
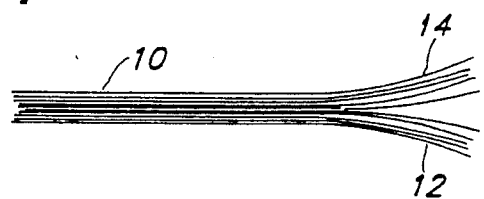
FIG. 1 is a front view of a tow of combined fibers and filaments used to make the braided sleeve of FIG. 2.

FIG. 1 shows a multi-filament tow 10 which may be used in accordance with the present invention. Tow 10 is composed of a plurality of filaments of thermoplastic material 12 together with a plurality of reinforcement fibers 14, such as carbon fibers. In an exemplary embodiment, the carbon tow 14 is a 12K tow (12,000 fibers) of 7200 denier (7,200 gms per 9,000 meter length), and the nylon tow 12 includes a minimum of 136 filaments of nylon so as to have a denier of approximately 4,050. Carbon fibers tows suitable for use in the invention, as well as tows of multi-filament nylon, are commercially available. Preferably, the tow 10 is coated with a thermoplastic-compatible sizing of approximately 0.5-2.0% by weight to promote the wetting of the fibers during the subsequent molding step.

The tows 10 may be formed by co-winding a tow of reinforcement fibers 14 and a tow of thermoplastic filaments 12, that is, by bringing a tow of fibers side-by-side with a tow of filaments, as shown in FIG. 1. It is also possible to commingle the tows of fibers and thermoplastic filaments or to use a powder prepreg process, as described further on. Generally, however, in any of the methods the desired ratio is about 38% by weight resin and 62% by weight reinforcement fiber.

Figure 2:
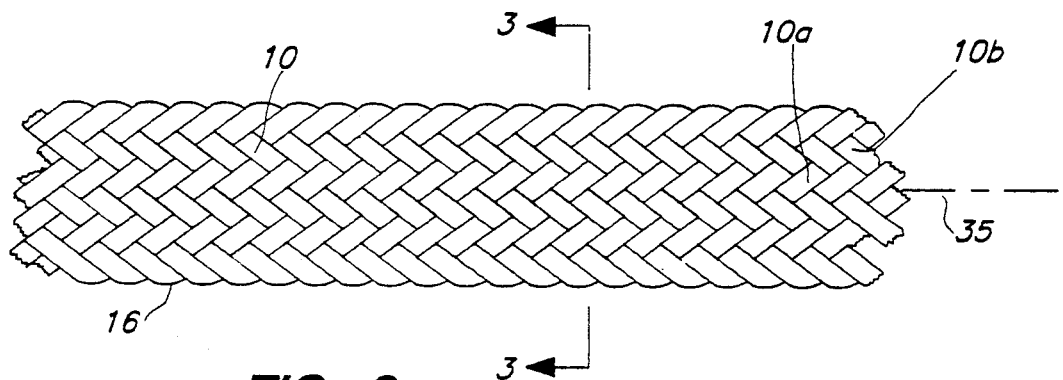
FIG. 2 is a front view of a section of braided sleeve used to make a frame according to the invention.
Figure 3:
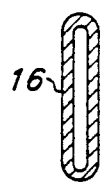
FIG. 3 is a sectional view, taken through lines 3—3 of FIG. 2, of the sleeve.
Figure 4:
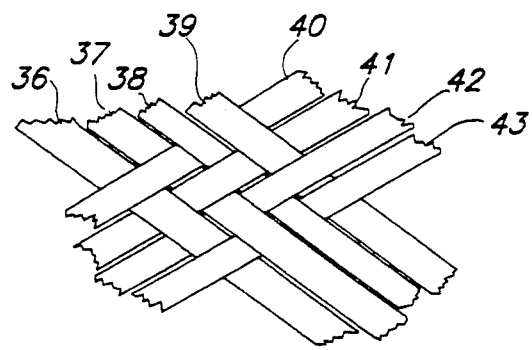
FIG. 4 is an enlarged, front view of a section of sleeve showing one example of a braiding pattern.

Referring to FIGS. 2-3, a plurality of tows 10 are braided to form a flexible tube or sleeve 16. FIGS. 2 and 4 show an exemplary braiding pattern, in which the tows 10 are oriented at selected angles, e.g., in the range of about a 15°-30° relative to the sleeve axis 35.

In the example of FIG. 2, the braided sleeve 16 is formed of sixteen side-by-side tows 10a which are helically wound in one direction, and sixteen cross tows 10b which are helically wound in the opposite direction so as to cross tows 10a. As can be seen more clearly in the example of a suitable braiding pattern depicted in FIG. 4, which shows four intersecting tows 10, tow 40 passes over a pair of crossing tows 36, 37, and then under the next pair of crossing tows 38, 39. This pattern would continue with successive pairs of crossing tows (which are omitted in FIG. 4 for clarity). Tow 41 passes under crossing tow 36, and then over pair 37, 38, and then under and over successive pairs, in the same pattern as tow 40, but shifted one cross tow to the right. Similarly, tows 42, 43 pass under and over pairs of cross tows, with each successive pattern shifted one cross tow to the right.

Braids can utilize a number of composite tows braided at specific angles at designated diameters. The frame may be comprised of multiple braids of different sizes, e.g., 24 carrier, 28 carrier, and 32 carrier, to form a multi-ply frame, where the higher number carriers are positioned toward the outside, where larger diameters are preferred.

In a preferred embodiment, 12K (12,000 filaments) tow of carbon fiber is combined with nylon thermoplastic filaments to achieve a 62% (by weight) fiber-reinforced structure. The inner braid has 24-carrier braid braided at a 25 degree angle (relative to the sleeve axis) to form a 0.562 inch diameter sleeve. A second 28-carrier braid, at a 22 degree angle and 0.625 inch diameter, is positioned over the inner braid. Before installing the outer braid, the second braid is reinforced with axially aligned fibers typically positioned at the 12 o'clock position of the racquet frame, or what will be the outwardly facing surface in the plane of the strings. The axial reinforcement fibers may be provided as a unidirectional woven tape which is approximately 25 mm wide and 400 mm long. This unidirectional tape may be attached to the second braid using mono-filament nylon which spiral wraps around the second braid. A 32-carrier braid, at a 20° angle and ¾ inch diameter, is positioned over the previous two braids to form the outer braid.

Preferably, all three braids are positioned over a rigid 0.562 inch mandrel. This will facilitate forming the proper overall size prior to packing in the mold. This will also assist in controlling weight.

The mandrel is then removed and the bladder is inserted inside the inner carrier braid to form the main tube assembly. The bladder is full length and extends beyond each end of the braid by 5 or 6 inches.

The foregoing is merely illustrative, and any desirable braiding pattern may be used. Moreover, it is not necessary to initially braid the tows. Braiding, however, produces a flexible sleeve which is easy to manipulate and use in further steps, without unravelling. The object, however, is to arrange the tows at the angle which is desired in the end product, and at the same time to ensure that thermoplastic filaments 14 are distributed throughout the sleeve and in relative close proximity to the reinforcement fibers 12, so that upon heating the thermoplastic will flow around the fibers.

Figure 5:
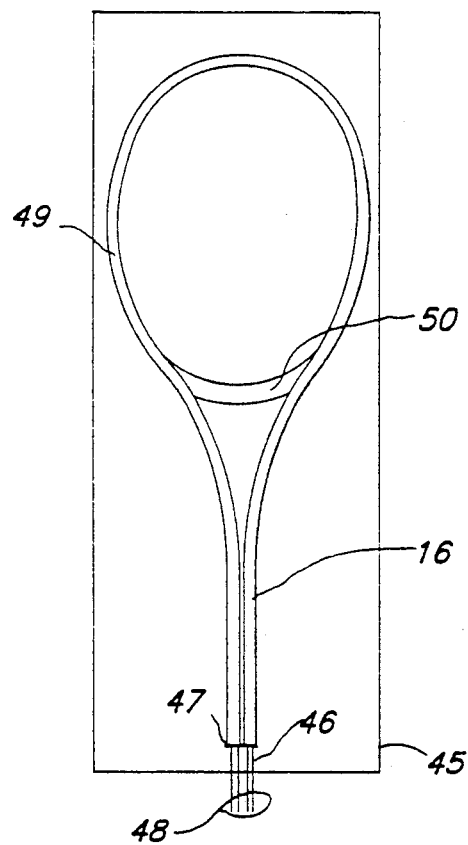
FIG. 5 is a front view showing a length of sleeve disposed in a mold for making a tennis racquet.

FIG. 5 illustrates the bottom half 45 of a mold that may be used to make a tennis racquet frame using the braided sleeve 16 of FIG. 2. The mold defines a continuous profile cavity 49 starting at the butt end 47 of the racquet frame, extending about the throat and head portions of the racquet, and terminating again at the butt end 47. To make the frame, a length of sleeve 16 is provided to extend along cavity 49 with opposite ends of the sleeve terminating at butt end 47. As noted above, preferably two or three sleeve elements are packed inside one another to form a multi-ply layup. The number of plies depends upon the desired wall thickness and weight of the resulting frame.

Prior to packing the sleeve 16 (or multi-ply layup) in the mold 18, inflatable bladder 46 is inserted through the sleeve 16 (or through the inner sleeve in a multi-ply configuration), such that the opposite ends 48 of the bladder 46 extend out the opposite ends of the sleeve 16. As shown in FIG. 5, the flexible sleeve 16 is positioned in the mold 45, such that the ends 48 of the bladder 46 project out of the mold.

A throat section 50 may be positioned in the mold, in the customary manner. Throat piece 50 may be an additional section of braided tube, which is disposed around an expandable foam core. The core should be of a material, such as a heat expandable foam, which can withstand the temperature necessary to melt the thermoplastic.

In an illustrative example, a foam core is precut, and three braids are positioned over the core, e.g., an inner 24 carrier braid, and middle 28 carrier braid, and an outer 32 carrier braid. Nylon monofilament is used to wrap and consolidate the throat assembly prior to packing in the mold. This helps to maintain the overall size of the throat assembly.

Because the thermoplastic is not yet coating the fibers and is in filament form, the bulk volume of the main tube assembly is greater than that of the final frame profile. It is thus necessary to pack and close the mold carefully so as to avoid pinching any material. In order to facilitate this, it is preferred to replace the insert plates used in thermoset processes (which use a top plate, bottom plate, and two insert plates) with full length side plates. The main tube assembly is positioned in the cavity of the bottom plate. The throat assembly is then positioned in its respective cavity and the ends of the throat are wrapped around the main tube assembly. Following this the top plate is attached to the bottom plate. Care is needed to ensure that upon closure of the top plate no material is pinched along the inside surfaces of the racquet frame.

Once the top plate is attached to the bottom plate, the side plates are moved inwardly to position the material within the cavity of the mold. Force may be required to achieve this, and it is important that the side plates fit precisely within the space between the top and bottom plate.

The mold is then bolted together, which will facilitate handling during the heating and cooling cycles. During heating and cooling, the mold should remain closed because the thermoplastic material remains soft when it is above its softening point, and internal pressure should be maintained inside the bladder during cooling until the thermoplastic is sufficiently hardened.

Once the braided sleeve 16 is inside the mold 45, the mold is closed and the bladder 46 is inflated. The mold is heated to temperature sufficient to melt the thermoplastic filaments 12, which in the case of nylon would typically be about 450°–500° Fahrenheit, while the bladder 46 remains inflated. The bladder may be inflated, in making a tennis racquet, to an internal pressure range of about 100 to 500 psi.

The bladder should be made of material which has a melt point temperature greater than the melting point of the thermoplastic material, such as silicone rubber, poly ether ether ketone (PEEK), or a higher melting point nylon. It is also possible to use a flouroelastomer bladder. In addition to temperature resistance, the bladder material should also have good elongation properties, good toughness, and good tear resistance.

Once the thermoplastic material melts, it will flow between the carbon fibers, embedding the carbon fibers in the thermoplastic. The pressure exerted by the bladder facilitates the flow of thermoplastic material and ensures that sleeve 16 conforms to the shape of the mold. Thereafter, the mold is cooled, to solidify the thermoplastic material, and the frame can then be removed from the mold.

The heating and cooling cycles need only be long enough to melt the thermoplastic, allowing time for the melted material to flow about the fibers, and then resolidify. In an exemplary process, the mold is subjected to a 40 minute heat up cycle at 500 degrees F. and a 20 minute cooling cycle. However, the lengths of the cycles depend upon the mold, the temperatures applied, and the pressure, and it may be possible to substantially reduce the cycle times.

Upon removal from the racquet mold, the frame can be treated like any molded thermoset racquet. Thus, non-filled holes are filled, the racquet is drilled and painted, and a handle is mounted on the shaft.

The bladder may or may not remain in the racquet frame, depending upon the weight of the bladder. PEEK bladders with a 0.003 inch wall thickness have a weight of about 8 gms and can be left in the racquet. Silicone rubber bladders weigh approximately 30 gms and may need to be removed.

Figure 6:
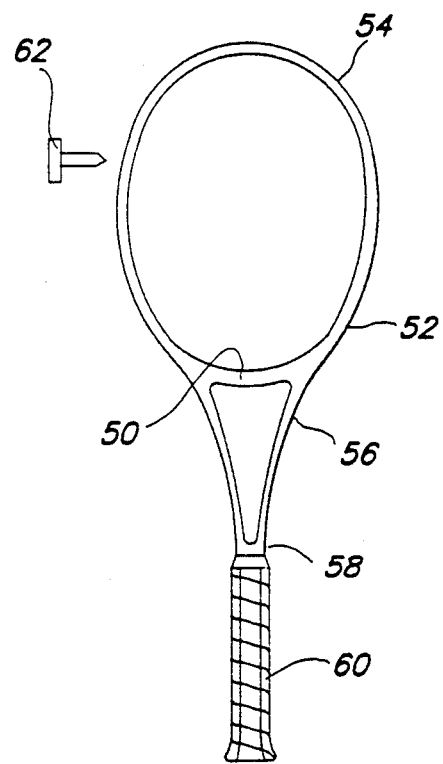
FIG. 6 is a front view of a tennis racquet frame made according to the invention.

As shown in FIG. 6, the frame 52, when removed from the mold, includes the conventional shape of the tennis racquet including a head portion 54, throat portion 56, and a shaft 58, all of which are formed from a continuous length of braided sleeve, together with the throat piece 50. As shown in FIG. 6, a handle 60 is provided on the shaft. Holes for stringing are formed in the racquet, preferably using a hot piercing needle 62. By using a hot piercing needle, the thermoplastic material can be melted, and stringing holes formed, without breaking the reinforcement carbon fibers. However, conventional drilling methods may also be employed with good results.

The resulting racquet frame 52 is formed of long reinforcement fibers oriented at the selected cross angles, which are intimately embedded in thermoplastic resin. As used herein, the term "long fibers" means a fiber having a length greater than one inch, i.e., greater than the lengths of fibers that may be used in known injection molding or extrusion processes. However, it will be appreciated that, using the preferred method of forming a racquet frame, in which tows of reinforcement fibers and thermoplastic fibers or powder are used, the reinforcement fibers will have lengths much longer than one inch, and in fact will extend continuously in a helical path the entire length of sleeve used to form the frame.

As discussed above, the tows 10 used to form the frame may be formed by co-winding reinforcement fibers and thermoplastic filaments, by commingling such fibers and filaments, or by powder impregnation of reinforcement fibers. In the co-winding method, a tow of structural fibers is wound side-by-side with a tow of thermoplastic filaments. No significant intermingling between fibers and filaments initially occurs, but upon strong consolidation pressure and heat within the mold, and with sufficient wetting, the thermoplastic will flow and surround the fibers to form a high strength frame.

The commingling method for forming a frame is similar to the co-winding process, except that the fibers and thermoplastic filaments are commingled prior to forming the braided sleeve. This is produced by taking a roll of fiber reinforcement tow material and combining it in set ratio with thermoplastic filaments so as to cause some initial interspersing of the fibers and filaments. The combined tow can be wound on a storage spool for later use. Upon subjecting the commingled tow to heat and consolidation pressure, the thermoplastic will flow to surround the reinforcing fibers as in the case of co-wound fibers and filaments. The use of commingled tows, however, will facilitate greater mixing and produce better wetting action and thus may be preferred in certain applications.

In a powder prepreg method, a tow of reinforcing fibers, for example a 12K tow of 7200 denier carbon fibers, is directed through a fluidized bed of thermoplastic material which is in the form of a fine powder. Prior to being dipped in the fluidized bed, the fibers in the tow are spread sufficiently such that thermoplastic material becomes intimately embedded in the fiber tow. After being impregnated with the thermoplastic powder, the fiber tow may, if desired, be encased in a sheath, e.g., of about 0.001 inch thickness, of thermoplastic material to help contain the powder trapped within the tow. The powder prepreg tow is then braided and processed in the manner described above. Fluidized bed apparatus designed to operate with thermoplastic powder, as well as thermoplastic wrapping sheath materials, are commercially available, and any suitable system may be employed.

Preferably, the braided sleeves are pre-formed, and may be stored in a roll. Thereafter, in manufacturing a tennis racquet or other implement, the sleeve material is taken off the roll in a tape form and can be cut and placed in the mold very similar to a thermosetting prepreg. The use of a braid is desirable since the braids are self-containing and the fibers will stay in place within the braid. In making a tennis racquet, it is preferable to place two or three tubular braids inside one another, depending upon the density of each braid, to produce the desired wall thickness and weight of the frame member. Inside the mold, the inflated bladder, in addition to conforming the product to the shape of the mold, also compacts the multiple plies. The heated resin, once above the melting point begins to flow and impregnates all of the reinforcing fibers. The internal pressure is maintained and compaction and consolidation of the composite material results.

The foregoing example uses carbon fiber as the reinforcement fiber. However, it is possible to use any of the reinforcement fibers currently used in thermoset racquets, as well as any other suitable reinforcing fibers. This would include fiberglass, Kevlar, Boron, and ceramic. The fiber used should receive a thermoplastic sizing (coating) compatible with the wetting action of the melted thermoplastic resin, in order to improve the handling of the co-wound or commingled tow and enhance wetting.

Numerous thermoplastic materials are suitable for use with the present invention. Nylon 6 is desirable due to its low melting point, good flowability, and good toughness. It is also readily available and can be produced in a filament or a powdered form. However, other thermoplastic materials, such as Nylon 6/6, Nylon 11, Nylon 12, Nylon 6/12, polyester, polycarbonate, polypropylene, ABS, polyethylene, or polyetheretherketone (PEEK) may also be used.

The foregoing represent preferred embodiments of the invention. Variations and modifications of the foregoing composition and method will be apparent to persons skilled in the art, without departing from the inventive concepts disclosed herein. For example, while co-winding, commingling, and powder impregnation are presently contemplated as the preferred methods of preparing flexible tows of combination fibers and thermoplastic for use in the invention, other suitable methods may be employed. All such modifications and variations are intended to be within the scope of the invention, as defined in the following claims.

I claim:

1. A method for making a frame for a sports racquet comprising the steps of:

combining a plurality of long reinforcement fibers with a thermoplastic material in a dry, flexible form so as to form a flexible tow;

forming a flexible sleeve from at least one tow of the combined fibers and thermoplastic, wherein the fibers are oriented at least one selected angle;

packing the sleeve into a mold having the shape of a sports racquet frame;

heating the sleeve to a temperature above the melting point of the thermoplastic while internally pressurizing the sleeve, such that the thermoplastic flows between the fibers and the sleeve assumes the shape of the mold; and cooling the sleeve to solidify the thermoplastic material while maintaining internal pressurization.

2. A method according to claim 1, wherein the thermoplastic material is in the form of a plurality of flexible, thermoplastic filaments; wherein the fibers and filaments are combined to form at least one tow; and wherein the sleeve is formed from said at least one tow.

3. A method according to claim 2, wherein the sleeve is formed by braiding at least one tow.

4. A method according to claim 3, wherein the fibers and filaments are co-wound to form said tow.

5. A method according to claim 3, wherein the fibers and filaments are commingled to form said tow.

6. A method according to claim 1, wherein the thermoplastic material is in the form of a powder, and wherein the fibers are immersed in a fluidized bed of thermoplastic powder to form a powder prepreg tow of fibers, and wherein at least one tow of powder prepreg fibers is used to form the sleeve.

7. A method according to claim 6, wherein the sleeve is formed by braiding at least one tow.

8. A method according to claim 1, wherein said sleeve is comprised of at least one helically wrapped tow.

9. A method according to claim 8, wherein said sleeve comprises at least one cross tow helically wrapped in a counter direction the said one tow.

10. A method according to claim 9, comprising the steps of forming an additional sleeve comprising a helically wrapped tow and cross tow, and disposing one of said sleeves inside the other prior to packing the sleeves into the mold, thereby to form a multiple ply frame.

11. A method according to claim 10, wherein the tows forming said sleeve are wrapped at an angle different from the respective tows forming the additional sleeve.

* * * * *